United States Patent
Bussey

(10) Patent No.: US 10,791,217 B1
(45) Date of Patent: Sep. 29, 2020

(54) METHODS AND SYSTEMS FOR PLACING CALLS

(71) Applicant: SALESLOFT, INC., Atlanta, GA (US)

(72) Inventor: Stephen Bussey, Atlanta, GA (US)

(73) Assignee: SALESLOFT, INC., Atlanta, GA (US)

( * ) Notice: Subject to any disclaimer, the term of this patent is extended or adjusted under 35 U.S.C. 154(b) by 0 days.

(21) Appl. No.: 16/558,692

(22) Filed: Sep. 3, 2019

(51) Int. Cl.
 *H04M 3/42* (2006.01)
(52) U.S. Cl.
 CPC ... *H04M 3/42059* (2013.01); *H04M 3/42008* (2013.01)
(58) Field of Classification Search
 CPC ......... H04M 3/42059; H04M 3/42008; H04M 3/42025; H04M 3/42034; H04M 3/42142; H04M 3/42153; H04M 3/42187
 USPC ...... 379/142.01, 142.02, 142.1, 142.15, 352, 379/142.09
 See application file for complete search history.

(56) References Cited

U.S. PATENT DOCUMENTS

| | | | |
|---|---|---|---|
| 7,760,865 B2 | 7/2010 | Awan et al. | |
| 8,064,342 B2 | 11/2011 | Badger | |
| 8,631,069 B2 | 1/2014 | Maes | |
| 9,256,695 B1 | 2/2016 | Willis et al. | |
| 9,392,122 B2 | 7/2016 | Sall | |
| 9,699,409 B1 | 7/2017 | Reshef et al. | |
| 9,992,448 B2 | 6/2018 | Reshef et al. | |
| 10,218,839 B2 * | 2/2019 | Gupta | H04M 3/382 |
| 10,325,284 B1 | 6/2019 | Aggarwal et al. | |
| 2007/0206759 A1 | 9/2007 | Boyanovsky | |
| 2009/0274284 A1 * | 11/2009 | Arsenault | H04M 15/06 379/142.1 |
| 2010/0135477 A1 * | 6/2010 | Chen | H04M 3/42059 379/142.05 |
| 2010/0205543 A1 | 8/2010 | Von Werther et al. | |
| 2010/0223389 A1 | 9/2010 | Ananthanarayanan et al. | |
| 2011/0228921 A1 | 9/2011 | Singh et al. | |
| 2011/0271210 A1 | 11/2011 | Jones et al. | |
| 2012/0051267 A1 * | 3/2012 | Ma | H04M 7/0075 370/259 |
| 2013/0076853 A1 | 3/2013 | Diao | |
| 2013/0191719 A1 | 7/2013 | Underhill et al. | |
| 2014/0006611 A1 | 1/2014 | Perez | |
| 2015/0036810 A1 * | 2/2015 | Rashid | H04M 3/42059 379/142.06 |
| 2016/0253314 A1 | 9/2016 | Pottier et al. | |

(Continued)

OTHER PUBLICATIONS

WebEx Meeting Center with Collaboration Meeting Rooms (CMR Cloud) User Guide, https://www.cisco.com/c/en/us/td/docs/collaboration/meeting_center/wbs2913/CMR_Cloud_User_Guide.pdf, total 24 pages, Publication Date: Aug. 1, 2014.
Pexip Mobile App for Android Quick Guide, https://docs.pexip.com/files/v8/Pexip_Mobile_App_Android_Quickguide_v8.a.pdf, Total 4 pages, Publication Date: Feb. 2015.
Lync conference invitations in SIP terms, http://blog.greenl.ee/2011/12/15/lync-conference-invitations!, Total 7 pages, Publication Date: Dec. 15, 2011.

(Continued)

*Primary Examiner* — Binh Kien Tieu
(74) *Attorney, Agent, or Firm* — DLA Piper LLP (US)

(57) ABSTRACT

Systems and methods are disclosed that can create, using a server, a record on a remote server associating a caller's phone number, a provider phone number, and a target phone number. Using a caller's device, a call can be placed to the provider phone number with the caller's phone number. A cloud telephony provider associated with the provider phone number can forward the call to the target phone number. Platform features available using the provider system can be available during the call.

18 Claims, 3 Drawing Sheets

(56) References Cited

U.S. PATENT DOCUMENTS

| | | | |
|---|---|---|---|
| 2016/0381215 A1* | 12/2016 | Goyal | H04M 3/5158 379/142.09 |
| 2017/0257598 A1 | 9/2017 | Reshef et al. | |
| 2017/0345325 A1 | 11/2017 | Metts | |
| 2018/0082208 A1 | 3/2018 | Cormier et al. | |
| 2018/0121828 A1 | 5/2018 | Keysers et al. | |
| 2018/0176661 A1 | 6/2018 | Varndell et al. | |
| 2018/0191901 A1* | 7/2018 | Aleksin | H04M 3/5183 |
| 2018/0227339 A1 | 8/2018 | Rodriguez et al. | |
| 2018/0239822 A1 | 8/2018 | Reshef et al. | |
| 2018/0249122 A1 | 8/2018 | Reshef et al. | |
| 2018/0268318 A1 | 9/2018 | Matam et al. | |
| 2018/0330736 A1 | 11/2018 | Faulkner et al. | |
| 2019/0068390 A1 | 2/2019 | Gross et al. | |
| 2019/0068526 A1 | 2/2019 | Xie et al. | |
| 2019/0102846 A1 | 4/2019 | Loschiavo | |
| 2019/0182183 A1 | 6/2019 | Hubauer et al. | |
| 2019/0205772 A1 | 7/2019 | Kohlmeier et al. | |
| 2019/0318743 A1 | 10/2019 | Reshef et al. | |

OTHER PUBLICATIONS

RFC4579—Session Initiation Protocol (SIP) Call Control—Conferencing for User Agents, https://datatracker.ietf.org/doc/rfc4579/ , pp. 3, Publication Date: Aug. 2006.

U.S. Appl. No. 15/852,259.

U.S. Appl. No. 16/518,367.

U.S. Appl. No. 16/524,653.

Image File Wrapper of U.S. Appl. No. 16/518,367 electronically captured from PAIR on Jun. 4, 2020 from Apr. 1, 2020 to Jun. 4, 2020.

Image File Wrapper of U.S. Appl. No. 16/524,653 electronically captured from PAIR on Jun. 4, 2020 from Apr. 22, 2020 to Jun. 4, 2020.

Image File Wrapper of U.S. Appl. No. 15/852,259 electronically captured from PAIR on Jun. 4, 2020 from Apr. 2, 2020 to Jun. 4, 2020.

Image File Wrapper of U.S. Appl. No. 16/855,610 electronically captured from PAIR on Jun. 4, 2020.

\* cited by examiner

METHODS AND SYSTEMS FOR PLACING CALLS

DETAILED DESCRIPTION OF EMBODIMENTS

Figure 1:
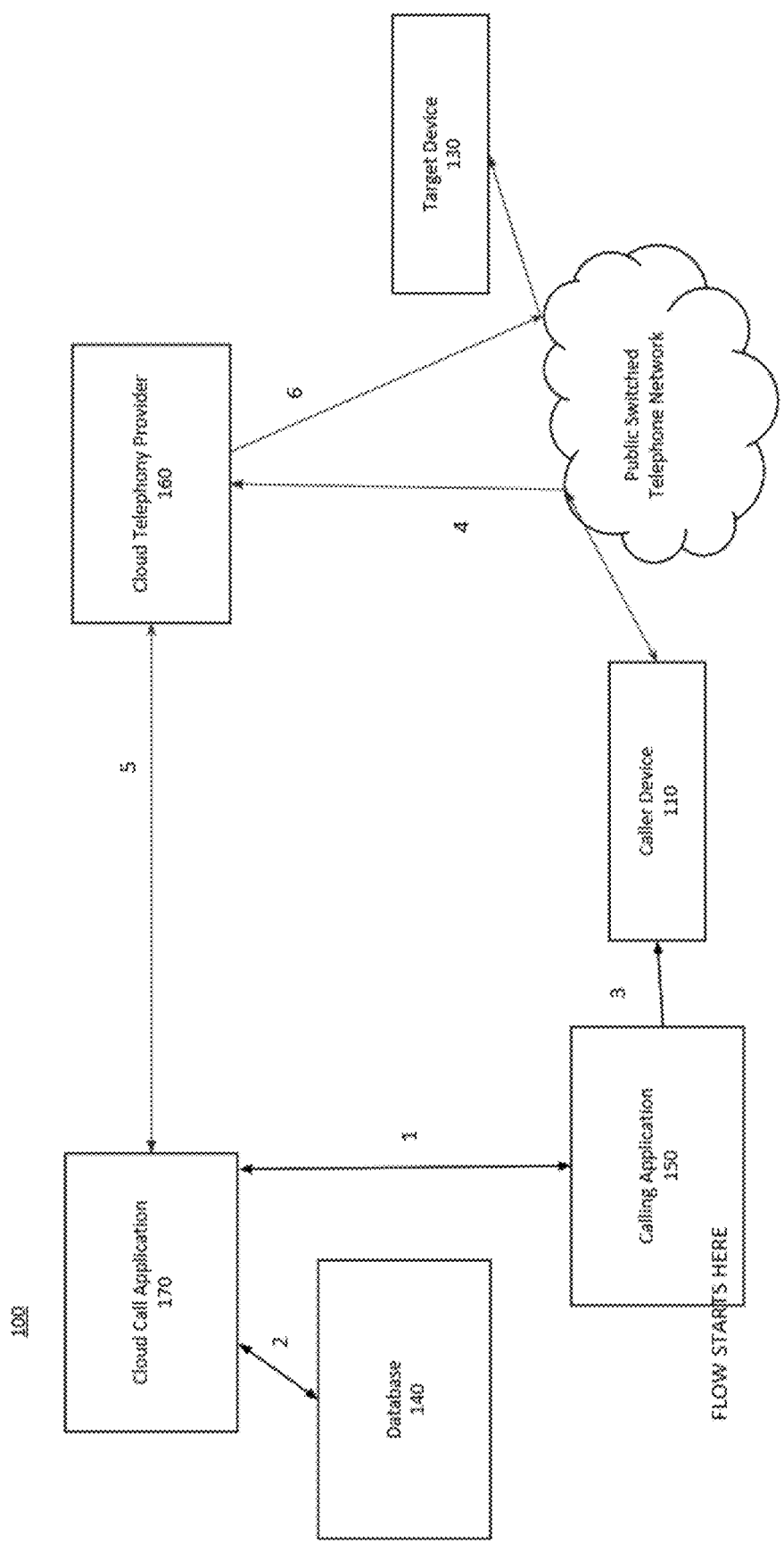
FIG. 1 illustrates a system 100 that can be used to place a call to a target, according to aspects of the disclosure.

FIG. 1 illustrates a system 100 (e.g., comprising a cloud call application 170) that can be used to place a call to a target, according to aspects of the disclosure. Referring to FIG. 1, a caller can use a caller device 110 to place a call through a network (e.g., a public switched telephone network (PSTN)) to a target on a target device 130. The caller can use a calling application 150 (e.g., which can be a mobile application on a mobile device). The calling application 150 can communicate (e.g., through the network) with a cloud call application server 170. The calling application 150 can create a record for each call made using the cloud call application server 170. In some embodiments, the records can be stored in a database 140.

For example, in some embodiments, the record can be created, using the cloud call application server 170. The record can associate a caller's device phone number, a provider phone number, and a target phone number. The caller's device can initiate the call, using the calling application 150, to the provider phone number with the caller's device phone number. The cloud telephony provider associated with the provider phone number can forward the call to the target phone number.

In some embodiments, the provider phone number can be used for the caller phone number. In addition, the provider phone number can be a cloud phone number. In some embodiments, calls can be placed via a phone, but can be routed via a cloud communications platform. The caller's device can be a base phone, or a cell phone, a Voice over IP (VoIP) phone, or any combination thereof. The caller's device phone number can be shown as a caller phone number identifying who a call is from. A caller can also change a caller identification phone number identifying who a call is from.

Figure 2:
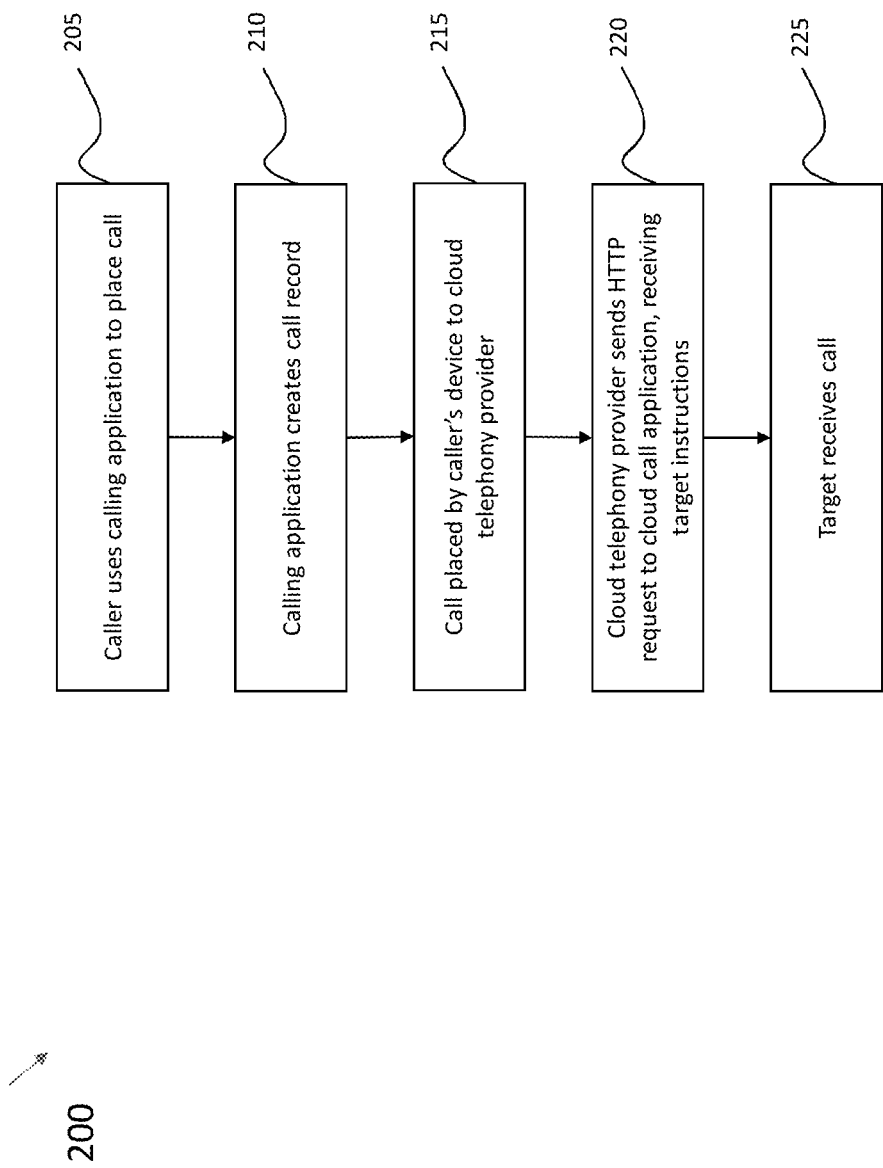
FIG. 2 illustrates a general method that can be used to place a call to a target, according to aspects of the disclosure.

FIG. 2 illustrates a general method that can be used to place a call to a target, according to aspects of the disclosure. In 205, a caller uses a calling application 150 to start placing a call. In some embodiments, the calling application 150 can be a mobile application used on a mobile device (e.g., iPhone, Android, etc.). In some embodiments, the calling application 150 can be a desktop phone application used on a desktop powered device. In 210, the calling application server 160 can create a call record. In 215, the call is placed by the caller's device to the cloud telephony provider using the calling application 150. In 220, the cloud telephony provider 160 calls back to the cloud call application, receiving the target instructions. In 225, the target receives the phone call from the caller and answers the call.

Figure 3:
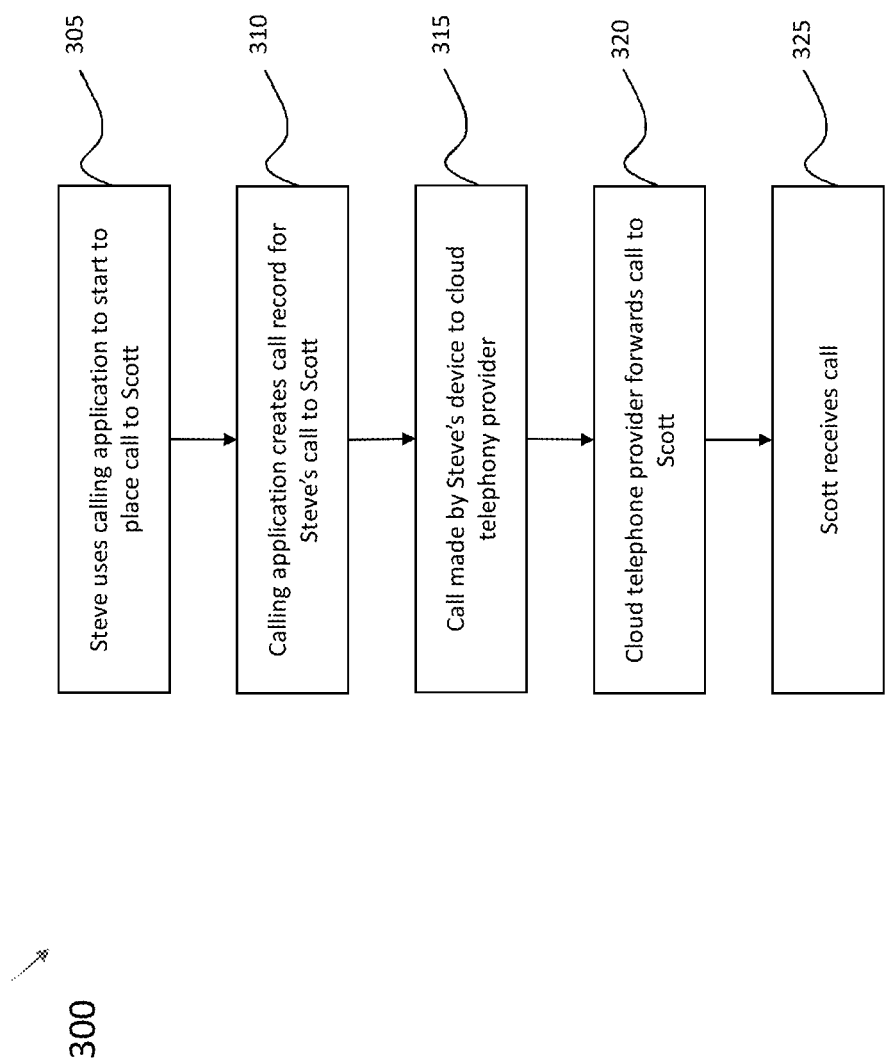
FIG. 3 illustrates a detailed example of a method that can be used to place a call to a target, according to aspects of the disclosure.

FIG. 3 illustrates a detailed example of a method that can be used to place a call to a target, according to aspects of the disclosure. In this example, the caller is named Steve, and the target is Scott. In 305, Steve wants to call Scott using the calling application 150. Scott's phone number is 111. Steve's cell number is 222, but Steve doesn't want Scott to see the number that he is calling from. Thus, Steve uses the calling application 150, which has a caller ID phone number of 333 and a second number of 444 associated with Steve. The phone number 333 can be Steve's assigned phone number within the company (e.g., SalesLoft). The phone number 444 can be a phone number that Steve's team owns. For example, this can be a number the company (e.g., SalesLoft) uses for the purposes of local dial for the company and/or for the team.

In 310, the calling application 150 can create a call record using the call application server 160. For example, the calling application 150 can send a request to the cloud telephony provider 160 to create a call record. The call record (in this example, we refer to it as R1) can include:

target_number=111 (Scott's phone number)
user_device_number=222 (Steve's cell number)
cloud_number=333 (Steve's assigned phone number in SalesLoft)
caller_id=444 (Steve's team's local dial number)
record_used_at=NULL
expires_at=NOW+5 Minutes In 315, the call can be made using the calling application 150. Thus, Steve can dials the cloud number (333) using his device (222). In some embodiments, this can happen by prompting the caller (e.g., user) to dial the number. In some embodiments, caller devices can allow a user to place a call without a prompt. The call can simply start.

In 320, the cloud telephony provider 160 can forward the call to the target. Thus, for example, the cloud telephony provider 160 can get a call FROM 222 (Steve's cell) TO 333 (Steve's assigned number). The cloud telephony provider 160 can do a lookup of (FROM=222, TO=333, record_used_at=NULL, not_expired) and find the call record that was just created (R1, caller_id=444). The cloud telephony provider 160 can deactivate this record (R1) to ensure that it is only used one time (R1.record_used_at=NOW). The cloud telephony provider 160 can then forward the call to the target (111) with the provided caller ID (444).

In 325, the target can receive the phone call from the caller and answer the call. Thus, in this example, Scott can receive a phone call FROM=444, and Steve can be connected to Scott when Scott answers his phone. In this example, Scott may not know Steve's cell phone number and/or know that Steve is calling from his cell phone number. In addition, the company (e.g., SalesLoft) dialer features can still be used in the call (Local Dial, Live Call Studio, Call Recording, etc), even though Steve is not calling using the company's phone system. In this way, any and/or all features of a company platform (e.g., a Sales Engagement platform) can be made available via the calling application 150 as though the caller had placed the call directly within the company's call system.

The following are example platform dialer features that can be used. Note that many other types of dialer features can also be used. Local Dial. This can comprise a caller ID based on a target's area code.

Live Call Studio—This can comprise live coaching and participation in calls by approved users.

Call Recording—This can produce a caller-side (user) or full (user+target) call recording of a call.

Call Logging—This can comprise notes, sentiment, disposition, or custom fields, or any combination thereof, and can be recorded by the user after or during a call. Syncing of Call Logs to CRM—The call logs recorded by the user can be written to the user's external CRM (e.g., Salesforce.com, Microsoft Dynamic, etc.).

Voicemail Drop—The user can pre-record voicemails and then select a voicemail to play to the target's answering machine.

Example Pseudocode

```
305
  MobileAppDialer.js
    function placeCall(toNumber, callContext) {
      // 305
      // Determine whether custom caller ID is being used
      const callerIdNumber = getCallerIdNumber(toNumber)
      // 305
      // Create the CallRecord on the cloud application server
      const call Record = CallRecord.API.create({
        userDeviceNumber: callContext.userDeviceNumber,
        targetNumber: toNumber,
        cloudNumber: callContext.cloudNumber,
        callerId: callerIdNumber
      })
      // Dial the user's assigned cloud number which will go to the target number in the end
      // 315
      Device.dialNumber(callRecord.cloudNumber)
    }
    function getCallerIdNumber(toPhoneNumber) {
      if(localDialEnabled) {
        const localDialCallerId = getLocalDialCallerId
        (toPhoneNumber)
        return localDialCallerId.caller_id_number
      } else{
        return assignedPhoneNumber
      }
    }
    // Data Types Involved in Flow
    CallContext(userDeviceNumber, cloudNumber)
    CallRecord(callerId, cloudNumber, targetNumber,
    userDeviceNumber)
310
  CallRecordCreator:
    // 310
    createRecord(params) {
      database.writeRecord(
        userDeviceNumber: params.userDeviceNumber,
        targetNumber: params.targetNumber,
        cloudNumber: params.cloudNumber,
        callerId: params.callerId
      )
    }
320
  TelephoneProviderRequest:
    // 320
    handleProviderRequest(params) {
      if callRecord = lookupCallRecord(params.from, params.to) {
        // The flow occurred, so route the inbound call to the target
        markCallRecordUsed(callRecord)
        routeCallToTarget(callRecord.targetNumber,
        callRecord.callerId)
      } else{
        // The flow didn't occur, so route the inbound call as otherwise
        routeInboundCall(params.to)
      }
    }
    lookupCallRecord(from, to) {
      database.callRecords.where(userDeviceNumber: from,
      cloudNumber: to).where(expired: false, used: false).first
    }
    markCallRecordUsed(callRecord) {
      database.callRecords.where(id: callRecord.id).update(used:
        true)
    }
    routeCallToTarget(targetNumber, callerId) {
```

Example Pseudocode—continued

```
      // The cloud provider instructions are specific to a particular
vendor, but always include what number to call and what number to
call as
        CloudProviderInstructions(
          dialNumber: targetNumber,
          useCallerId: callerId
        )
    }
```

CONCLUSION

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

The invention claimed is:

1. A method, comprising:
   creating, using a cloud call application on a server, a record associating a caller's phone number, a provider phone number, and a target phone number;
   placing, using a caller's device, a call to the provider phone number with the caller's phone number;
   forwarding, by a cloud telephony provider associated with the provider phone number, the call to the target phone number; and
   deactivating, by the cloud call application, the record to ensure the record is only used one time;
   wherein platform features available using the provider system are available during the call.

2. The method of claim 1, wherein the provider phone number is a cloud phone number.

3. The method of claim 1, wherein calls are placed via a phone, but are routed via a cloud communications platform.

4. The method of claim 3, wherein the caller's device is a base phone or a cell phone.

5. The method of claim 3, wherein the caller's device is a Voice over IP (VoIP) phone.

6. The method of claim 1, wherein the caller's device phone number is shown as a caller phone number identifying who a call is from.

7. The method of claim 1, wherein a caller can change a caller identification phone number identifying who a call is from.

8. The method of claim 1, wherein the platform features comprise: local dial, live call studio, call recording, call logging, syncing of call logs to CRM, or voicemail drop, or any combination thereof.

9. The method of claim 1, wherein the platform features comprise at least three of: local dial, live call studio, call recording, call logging, syncing of call logs to CRM, or voicemail drop, or any combination thereof.

10. A system, comprising:
a processor configured for:
creating, using a cloud call application on a server, a record associating a caller's phone number, a provider phone number, and a target phone number;
placing, using a caller's device, a call to the provider phone number with the caller's phone number; and
forwarding, by a cloud telephony provider associated with the provider phone number, the call to the target phone number;
deactivating, by the cloud call application, the record to ensure the record is only used one time;
wherein platform features available using the provider system are available during the call.

11. The system of claim 10, wherein the provider phone number is a cloud phone number.

12. The system of claim 10, wherein calls are placed via a phone, but are routed via a cloud communications platform.

13. The system of claim 12, wherein the caller's device is a base phone or a cell phone.

14. The system of claim 12, wherein the caller's device is a Voice over IP (VoIP) phone.

15. The system of claim 10, wherein the caller's device phone number is shown as a caller phone number identifying who a call is from.

16. The system of claim 10, wherein a caller can change a caller identification phone number identifying who a call is from.

17. The system of claim 10, wherein the platform features comprise: local dial, live call studio, call recording, call logging, syncing of call logs to CRM, or voicemail drop, or any combination thereof.

18. The system of claim 10, wherein the platform features comprise at least three of: local dial, live call studio, call recording, call logging, syncing of call logs to CRM, or voicemail drop, or any combination thereof.

* * * * *